(12) United States Patent
Cheng et al.

(10) Patent No.: US 11,204,602 B2
(45) Date of Patent: Dec. 21, 2021

(54) EARLY ANOMALY PREDICTION ON MULTI-VARIATE TIME SERIES DATA

(71) Applicant: NEC Laboratories America, Inc., Princeton, NJ (US)

(72) Inventors: Wei Cheng, Princeton Junction, NJ (US); Haifeng Chen, West Windsor, NJ (US); Masanao Natsumeda, Princeton Junction, NJ (US)

(73) Assignee: NEC Corporation

( * ) Notice: Subject to any disclaimer, the term of this patent is extended or adjusted under 35 U.S.C. 154(b) by 244 days.

(21) Appl. No.: 16/433,206

(22) Filed: Jun. 6, 2019

(65) Prior Publication Data

US 2019/0391574 A1 Dec. 26, 2019

Related U.S. Application Data

(60) Provisional application No. 62/689,266, filed on Jun. 25, 2018.

(51) Int. Cl.
*G05B 23/02* (2006.01)
*G06N 3/04* (2006.01)
*G06F 17/16* (2006.01)
*G06K 9/62* (2006.01)
*G06N 3/08* (2006.01)

(52) U.S. Cl.
CPC ......... *G05B 23/0283* (2013.01); *G06F 17/16* (2013.01); *G06K 9/6215* (2013.01); *G06N 3/0454* (2013.01); *G06N 3/084* (2013.01)

(58) Field of Classification Search
CPC .............. G05B 23/0283; G05B 23/024; G06N 3/0454; G06N 3/084; G06N 3/08;
(Continued)

(56) References Cited

U.S. PATENT DOCUMENTS 8,185,781 B2 5/2012 Chen et al.
2018/0300621 A1* 10/2018 Shah ..................... G06N 3/08
(Continued)

OTHER PUBLICATIONS

Feng et al. , Multi-level Anomaly Detection in Industrial Control Systems via Package Signatures and LSTM networks, IEEE (Year: 2017).*

(Continued)

*Primary Examiner* — Mohammad K Islam
(74) *Attorney, Agent, or Firm* — Joseph Kolodka

(57) ABSTRACT

Systems and methods for early anomaly prediction on multi-variate time series data are provided. The method includes identifying a user labeled abnormal time period that includes at least one anomaly event. The method also includes determining a multi-variate time series segment of multivariate time series data that occurs before the user labeled abnormal time period, and treating, by a processor device, the multi-variate time series segment to include precursor symptoms of the at least one anomaly event. The method includes determining instance sections from the multi-variate time series segment and determining at least one precursor feature vector associated with the at least one anomaly event for at least one of the instance sections based on applying long short-term memory (LSTM). The method further includes dispatching predictive maintenance based on the at least one precursor feature vector.

19 Claims, 9 Drawing Sheets

(58) Field of Classification Search
CPC .... G06N 3/0445; G06N 3/0472; G06F 17/16; G06K 9/6215; G06K 9/627; G06K 9/00536; G06K 9/00523
See application file for complete search history.

(56) References Cited

U.S. PATENT DOCUMENTS

| | | | | |
|---|---|---|---|---|
| 2018/0373841 | A1* | 12/2018 | Harpale | G06N 7/08 |
| 2019/0219994 | A1* | 7/2019 | Yan | G05B 17/02 |
| 2019/0354836 | A1* | 11/2019 | Shah | G06N 3/0454 |
| 2020/0097810 | A1* | 3/2020 | Hetherington | G06N 3/0445 |
| 2020/0364563 | A1* | 11/2020 | Lumezanu | G06N 3/0445 |
| 2021/0003974 | A1* | 1/2021 | Yang | G05B 13/048 |

OTHER PUBLICATIONS

Nanduri et al., Anomaly detection in aircraft data using recurrent neural networks (rnn), (Year: 2016).*

Patankar, "Failure Precursor Detection in Complex Electrical Systems Using Symbolic Dynamics", International Journal of Signal and Imaging Systems Engineering, vol. 1, No. 1, Jan. 2008, pp. 68-77.

Ahmad, "Unsupervised Real-Time Anomaly Detection for Streaming Data", Neurocomputing, vol. 262, Nov. 2017, pp. 134-147.

Hundman, "Detecting Spacecraft Anomalies Using LSTMs and Nonparametric Dynamic Thresholding", Proceedings of the 24th ACM SIGKDD International Conference on Knowledge Discovery & Data Mining, Aug. 2018, pp. 387-395.

Chen, "Exploiting Local and Global Invariants for the Management of Large Scale Information Systems", Proceedings of the 2008 Eighth IEEE International Conference on Data Mining, Dec. 2008, pp. 113-122.

Cheng, "Ranking Causal Anomalies via Temporal and Dynamic Analysis on Vanishing Correlations", KDD, Aug. 2016, 10 pages.

Hochreiter, "Long Short-Term Memory", Neural Computations, vol. 9, No. 8, Nov. 1997, pp. 1775-1780.

* cited by examiner

700

Identifying a user labeled abnormal time period that includes an anomaly event
710

Determining a multi-variate time series segment that occurs before the user labeled abnormal time period
720

Treating the multi-variate time series segment to include precursor symptoms of the anomaly event
730

Determining instance sections from the multi-variate time series segment
740

Determining a precursor feature vector for each instance sections based on LSTM
750

FIG. 9

EARLY ANOMALY PREDICTION ON MULTI-VARIATE TIME SERIES DATA

RELATED APPLICATION INFORMATION

This application claims priority to U.S. Provisional Patent Application No. 62/689,266, filed on Jun. 25, 2018, incorporated herein by reference herein its entirety.

BACKGROUND

Technical Field

The present invention relates to multi-variate time series data and more particularly anomaly detection in multi-variate time series data.

Description of the Related Art

Early anomaly prediction is the process of discovering the early symptoms of system failures on (for example, multi-variate time series data monitoring) system components. In multi-variate time series data monitoring, user provided labeled period of time series can indicate the status of an abnormal phase of a system. However, the particular time that the system shows early symptoms (that eventually result in the abnormal phase) is usually uncertain.

SUMMARY

According to an aspect of the present invention, a method is provided for early anomaly prediction on multi-variate time series data are provided. The method includes identifying a user labeled abnormal time period that includes at least one anomaly event. The method also includes determining a multi-variate time series segment of multivariate time series data that occurs before the user labeled abnormal time period, and treating, by a processor device, the multi-variate time series segment to include precursor symptoms of the at least one anomaly event. The method includes determining instance sections from the multi-variate time series segment and determining at least one precursor feature vector associated with the at least one anomaly event for at least one of the instance sections based on applying long short-term memory (LSTM). The method further includes dispatching predictive maintenance based on the at least one precursor feature vector.

According to another aspect of the present invention, a system is provided for early anomaly prediction on multi-variate time series data. The system includes a processor device operatively coupled to a memory device. The processor device identifies a user labeled abnormal time period that includes at least one anomaly event. The processor device determines a multi-variate time series segment of multivariate time series data that occurs before the user labeled abnormal time period. The processor device treats the multi-variate time series segment to include precursor symptoms of the at least one anomaly event and determines instance sections from the multi-variate time series segment. The processor device determines at least one precursor feature vector associated with the at least one anomaly event for at least one of the instance sections based on applying long short-term memory (LSTM) and dispatches predictive maintenance based on the at least one precursor feature vector.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 9 is a flow diagram illustrating a method for early anomaly prediction on multi-variate time series data, in accordance with the present invention.

DETAILED DESCRIPTION OF PREFERRED EMBODIMENTS

In accordance with the present invention, systems and methods are provided for implementing accurate early fault detection and diagnosis for complex and dynamic physical systems. The systems detect early precursor symptoms associated with subsequent system failure. The detection is based on the analysis on the multi-variate time series and automatically focuses on (for example, zooms into) the region where the precursor symptoms occur (for example, show up, provide an indication, etc.), so that the model provides an interpretable analysis.

The systems and methods provided herein allow multiple advantages for systems that monitor system components to identify the abnormal phase of a system. The systems incorporate multi-instance learning so that users can make use of labeled data that include uncertainty about when exactly the precursor symptoms occur. The systems also make use of contrastive loss and thereby enable extraction of precursor features even in instances in which the labeled data is (for example, very) limited. In example embodiments, the systems place a constraint in which the features in the precursor symptoms are the subset of the features of the real abnormal events, and therefore ensure that the inferred precursor features are more robust and interpretable.

In one embodiment, the systems utilize user labels and limited (or none) domain knowledge to detect precursors of anomalies. The systems consider the user provided label information to obtain inferences regarding the anomalies. The systems detect the (symptoms of imminent, future, etc.)

system failure earlier and are capable of early symptoms extraction. The systems isolate an initial time that a fault begins.

The systems and methods herein provide a model that can be used by (for example, complex) physical systems, such as a nuclear power plant 102, a chemical production system, etc. These complex physical systems use sensors to monitor different components, such as temperature, pressure, etc. The collected multi-variate time series can then be utilized to conduct automatic anomaly early detection.

Figure 1:
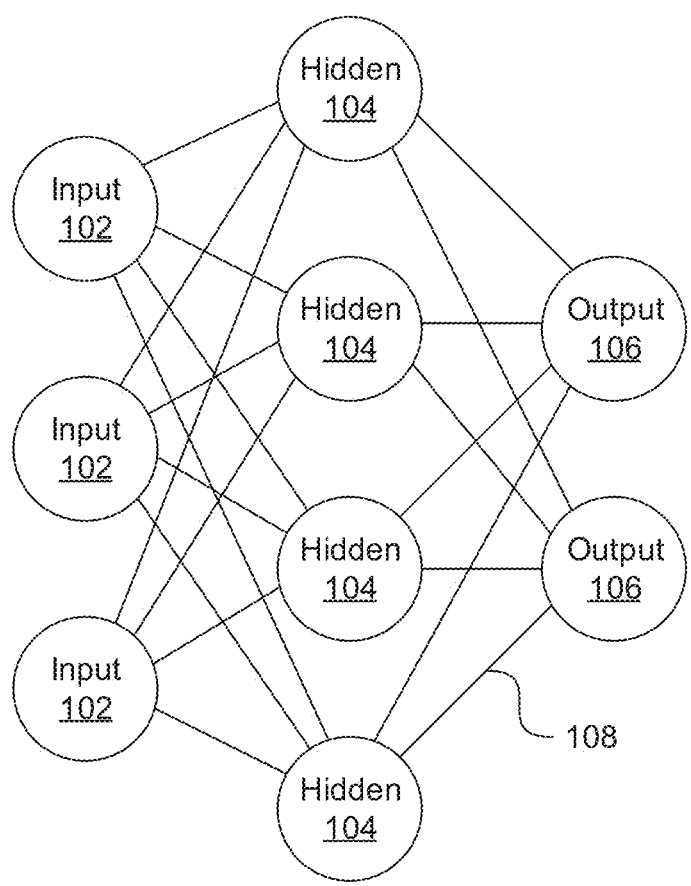
FIG. 1 is a generalized diagram of a neural network, in accordance with an embodiment of the present invention.

Referring now in detail to the figures in which like numerals represent the same or similar elements and initially to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
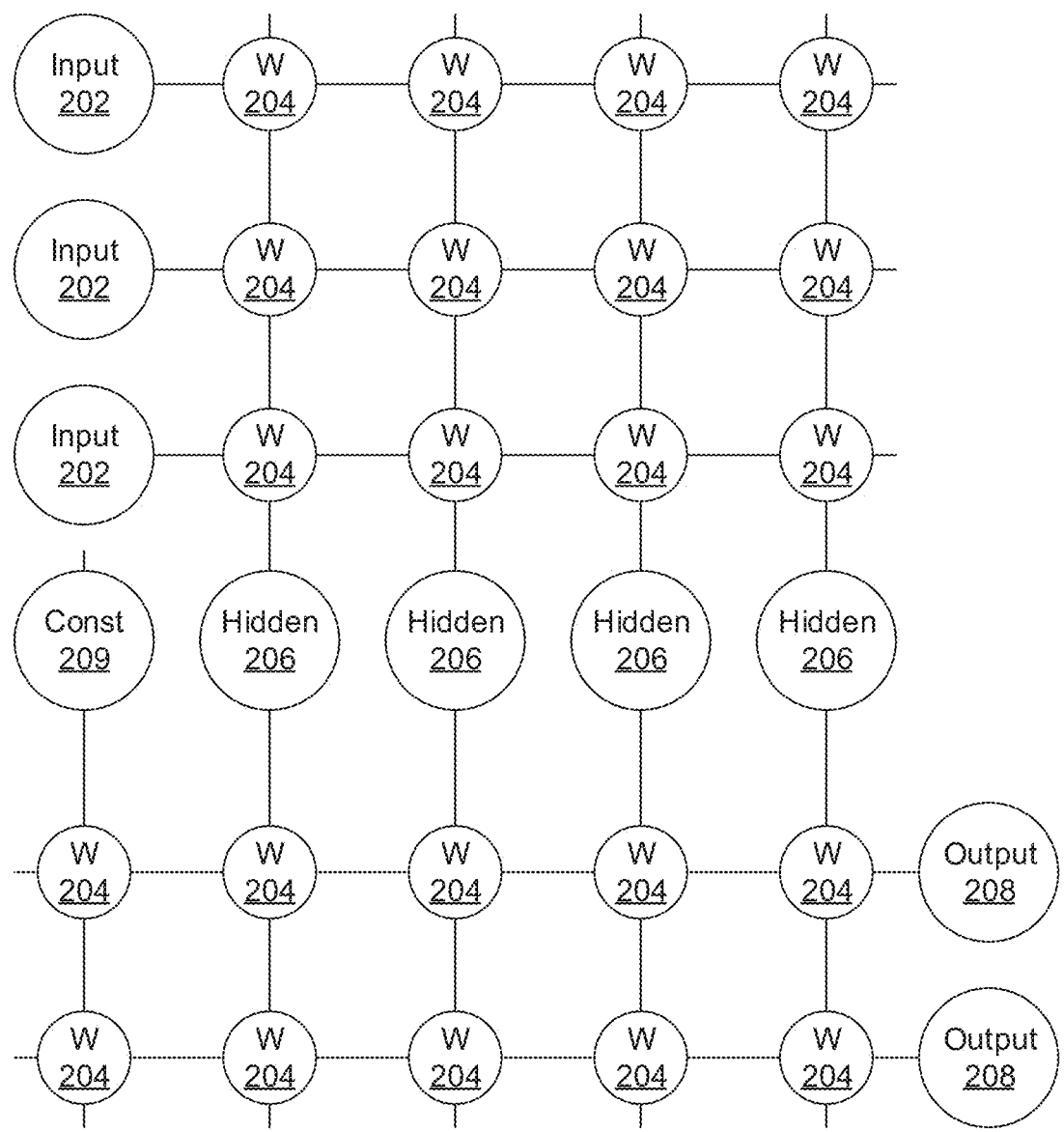
FIG. 2 is a diagram of an artificial neural network (ANN) architecture, in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

Figure 3:
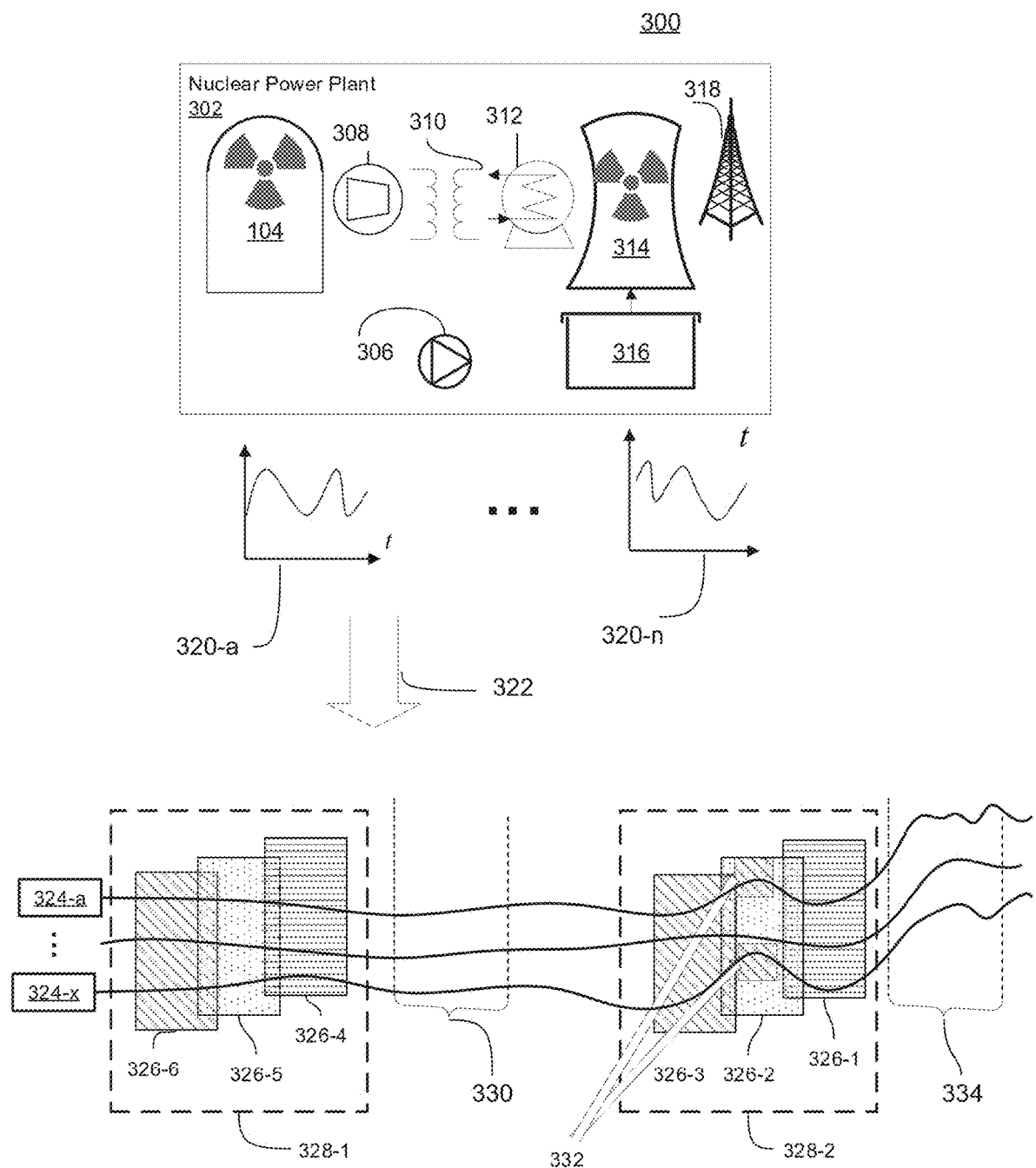
FIG. 3 is a block diagram illustrating early anomaly prediction in a nuclear power plant system, in accordance with the present invention.

FIG. 3 illustrates an example embodiment of a system 300 that utilizes early anomaly prediction in a complex cyber-physical 302 system, according to an example embodiment.

As shown in FIG. 3, complex cyber-physical 302 system is embodied in a nuclear power plant to facilitate efficient elucidation. Any complex cyber-physical systems can use the provided processes of the example embodiments described herein for anomaly detection. For example, chemical plant or electric power systems can have different sensors to monitor values of different equipment. The data collected in these instances are multi-variate time series data. The example embodiments can be implemented in these instances to perform early anomaly detection task based upon this multi-variate time series data.

Different sensors 324 (shown, by way of example, as 324-a to 324-x) are deployed in different equipment (components) of the complex physical system (for example, containment building 304, pump 306, turbine 308, generator 310, transformer 312, cooling tower 314, cooling water source 316 and electrical tower 318, etc., in a nuclear power plant 302). The systems collect (or receive) 322 historical observation of multi-variate time series data (shown, by way of example, as time series data 320-a to 320-n). With the passage of time and ensuing operation of the nuclear power plant 302, historical anomaly events (not shown in FIG. 3) of different types can be recorded. Note that initially, only the anomaly events rather than the precursors are reported.

With regard to FIG. 3, the system determines bags 328 of instances 326 of time series data that result in (or precede) no anomaly event 330 (for example, instances 326-4 to 326-6) and identifies bags (for example, the bag 328 that includes instances 326-1 to 326-3) and instances 326 (particularly 326-2) that precede the annotated anomaly event 334, which is in the last period of the (displayed) time series. The systems described herein take advantage of historical annotated anomaly events to infer precursor features 332 together with when an exact time that the precursor features 332 occur for different types of anomalies. By making use of inferred precursor 332 features, the systems predict (or early detect) the same type of anomaly in the future running of the complex physical system. In FIG. 3, the system analyzes the input multi-variate time series data to detect precursor symptoms 332 in instance 2 (326-2).

Figure 4:
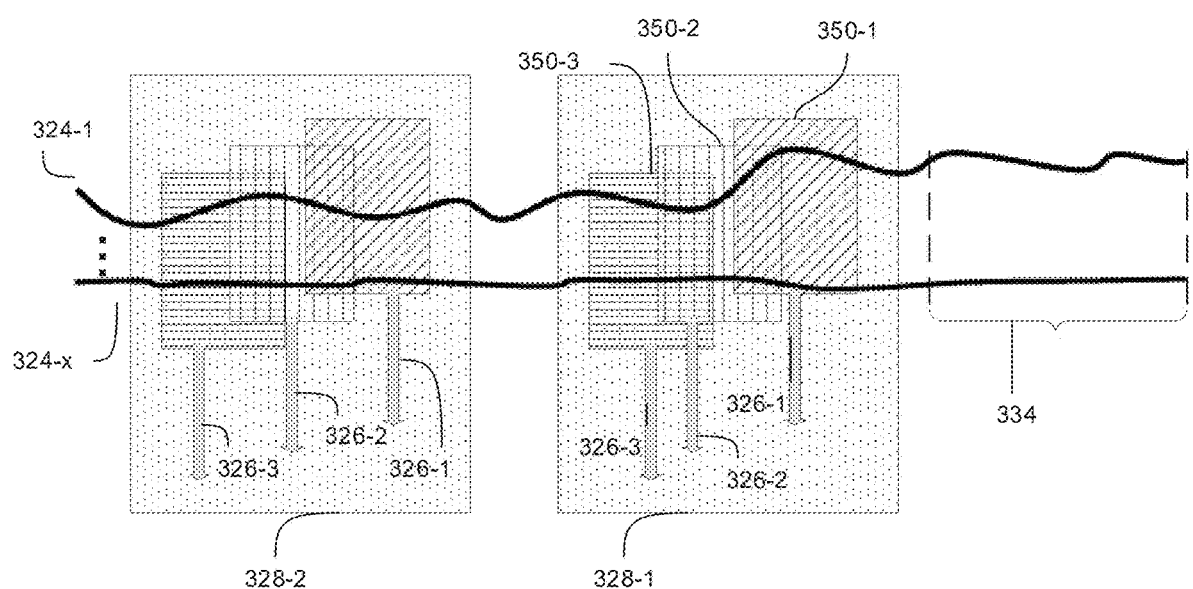
FIG. 4 is a block diagram illustrating a large multi-variate time series time segment prior to treatment of a user labeled abnormal time period, in accordance with the present invention.

Referring now to FIG. 4, a large multi-variate time series time segment prior to treatment of a user labeled abnormal time period is illustratively depicted in accordance with an example embodiment.

From a first perspective, the user can only observe the system failure when (for example, a lot of) problems have already occurred. Thus, the user's label of an abnormal period 334 indicates the server problematic period rather than the time point that precursor symptoms 332 (not shown in FIG. 4) begin to occur. From another perspective, the exact time point that the precursor symptoms 332 occur is difficult to identify by users (observance of the complex physical system). Due to the uncertainty of when the precursor symptoms 332 occur, a user can encounter difficulties when attempting to use the user labels to learn the precursor (symptom) features 332 on multi-variate time series.

To address the problem of uncertainty of timing of the precursor symptoms 332, the systems use multi-instance learning with attention strategy (for example, a strategy of analysis based on weights of attention, as described herein below with respect to FIG. 4) that focuses on extracting precursor symptoms 332 and detecting exactly when the precursor symptoms 332 occur.

As shown in FIG. 4, the systems first treat (for example, apply a mathematical model or protocol) a (for example, relatively large) multi-variate time series time segment before the user labeled abnormal time period to include the precursor symptoms 332 of the subsequent anomaly event 334. For each user labeled event 334, the system precursor bags 328 (shown, for example, as 328-1 and 328-2). The label associated with the subsequent event is used as the label of the precursor bag 328. The system further slits (for example, divides, breaks, etc.) each bag 328 into (for example, a bunch of) instance segments 326 (for example, sections, pieces, etc.) to identify when the early precursor symptoms 332 occur. These instances 326 may have some overlaps (for example, 326-3 overlaps with 326-2, etc.).

For each instance 326, the system employs long short-term memory (LSTM) 450 (shown as LSTM 450-1 to 450-3) to learn the feature vector $h_k$. LSTM includes a recurrent network architecture in conjunction with an appropriate gradient-based learning algorithm. LSTM can overcome error back-flow problems and learn to bridge time intervals in cases of noisy, incompressible input sequences, without loss of short time lag capabilities by use of the gradient-based algorithm. The feature vector of each whole bag 328 is the assembly of $h_k$'s using attention style combination with equation (1), herein below. The weights of attention are learned by a 3-layer neural network with gated fashion in equation (2), herein below.

In one embodiment, $$z = \Sigma_{k=1}^{K} a_k \square_k \qquad \text{Equation (1).}$$

$$a_k = \text{soft max}(w^T(\tanh(V h_k^T) \square \text{sigmoid}(U h_k))) \qquad \text{Equation (2).}$$

In the above equations z is a feature vector (the aggregation of features of a set of instance in the bag, for example, a representation of an entire (whole) bag), K is a total number of instances in one bag, k is a variable associated with each instance, for example, an index of instances in each bag, a is an attention weight of a given instance, h is a feature vector (the feature vector of each individual instance), w is a vector, T is the transpose operator, V is matrix, U is a matrix and tanh is a rescaled logistic sigmoid function. w, V, and U are all parameters to be optimized (during deep learning).

Figure 5:
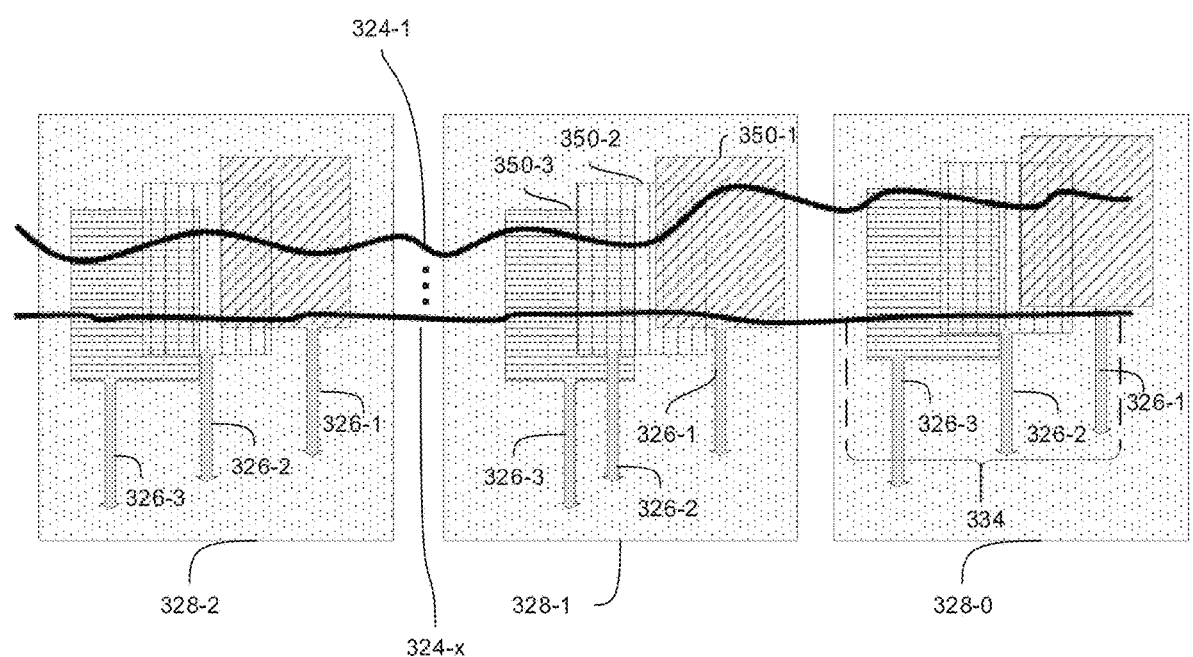
FIG. 5 is a block diagram illustrating a large multi-variate time series time segment with a labeled anomaly period, in accordance with the present invention.

Referring now to FIG. 5, a block diagram illustrating a large multi-variate time series time segment with a labeled anomaly period is illustratively depicted in accordance with an example embodiment.

As shown in FIG. 5, to further make use of abnormal period for feature generation, the system considers (for example, analyzes) the feature of abnormal period 334. The system denotes the bag 328 of abnormal period 334 as Bag 0 (328-0). The feature vector that is learned from Bag 0 is denoted as z0, the feature vector of Bag 1 is denoted by z1, and then the system applies the following constraint.

$$\max((\text{sigmoid}(z1) - \text{sigmoid}((z0)), 0). \qquad \text{Equation (3).}$$

The systems described herein are subject to two losses, one is contrastive loss, that is used to constraint the precursors in the same category should be similar and from different categories should be dissimilar. Another is hinge loss that is used to better learn the features of precursor. The hinge loss provides a constraint that the features of precursors should be a subset of that in the subsequent real anomaly event. The two losses are added up in the same objective function to be optimized.

Figure 6:
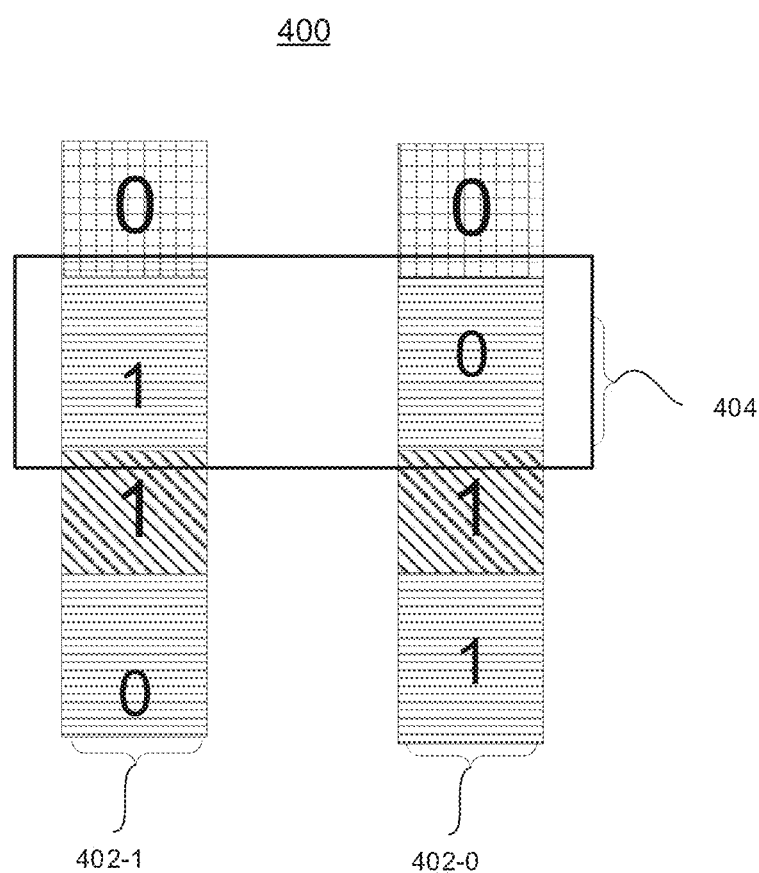
FIG. 6 is a block diagram illustrating sigmoid functions for a constraint loss, in accordance with the present invention.

The procedure 400 for determining an intuition of the constraint loss is illustrated in FIG. 6.

An intuition of a constraint loss is used to provide a constraint that the precursors in the same category should be similar and from different categories should be dissimilar. The system initially pushes (for example, directs, influences, etc.) the elements of feature vectors $z_1$ and $z_2$ to be either 1 or 0 using a sigmoid function (Sigmoid($z_1$) 402-1, and Sigmoid($z_0$) 402-0), and then selects the instance in which the features inferred in $z_1$ are the subset of $z_0$. This selection assumes that the precursor features are also included in the real abnormal period. The system uses hinge loss to penalize the case that this assumption is not obeyed. In this instance the hinge loss is used to provide a constraint that the features in the precursor should be the subset of features in the real anomaly period. The system trains the model by feeding (for example, a lot of) training data to the model to learn the shared features by the same category precursors.

The system uses the contrastive loss 404 to learn the feature vectors. The objective function is shown below, equation (4):

$$\text{Bag pair loss: } (1-Y)\tfrac{1}{2}(Dw)^2+(Y)\tfrac{1}{2}\{\max(0,m-Dw)\}^2 \quad \text{Equation (4).}$$

Contrastive loss can be used in image retrieval tasks to learn discriminative features for images. With regard to Y, two bags belong to same label, Y=0, else Y=1. Dw is the distance between $z_1$ and z2. The Dw is the distance function, in this instance Euclidian distance. The hinge loss is used to penalize the dissimilar pair. For example, if two bags belong to the same category, then the bag representation of the two should be as similar as possible. If they are not similar, these bags should have a penalty assessed (or assigned, added, etc.).

Figure 7:
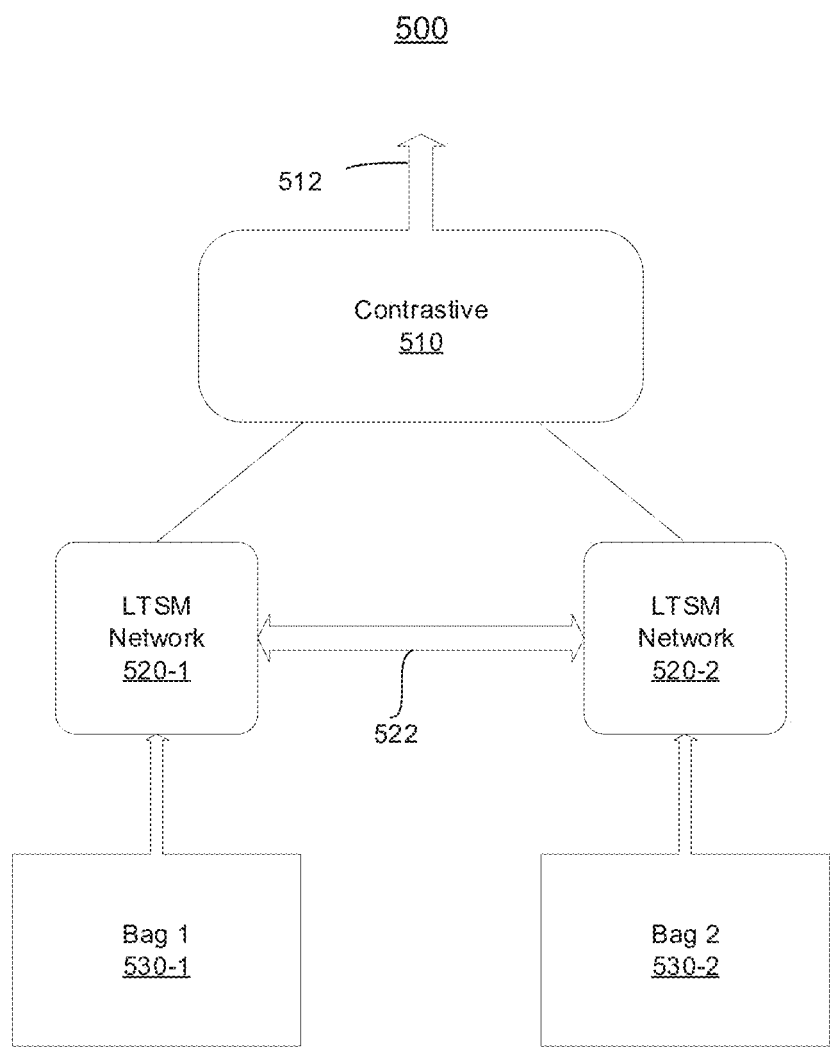
FIG. 7 is a block diagram illustrating a training framework, in accordance with the present invention.

Referring now to FIG. 7, a block diagram illustrating a training framework 500 is shown, according to an example embodiment.

The general training framework is illustrated in FIG. 7. Note that the LSTM parameters (processed by LTSM networks 520, particularly LTSM networks 520-1 and 520-2) are shared by different bags 530 (shown as bag 1 530-1 and bag 2 530-2) in the training process. LTSM networks 520-1 and 520-2 access shared weights 522 and determine contrastive loss 510 between bags 350-1 and 350-2. The contrastive loss is then sent 512 to the system to learn the feature vectors, such as described with respect to FIG. 5 herein above.

Figure 8:
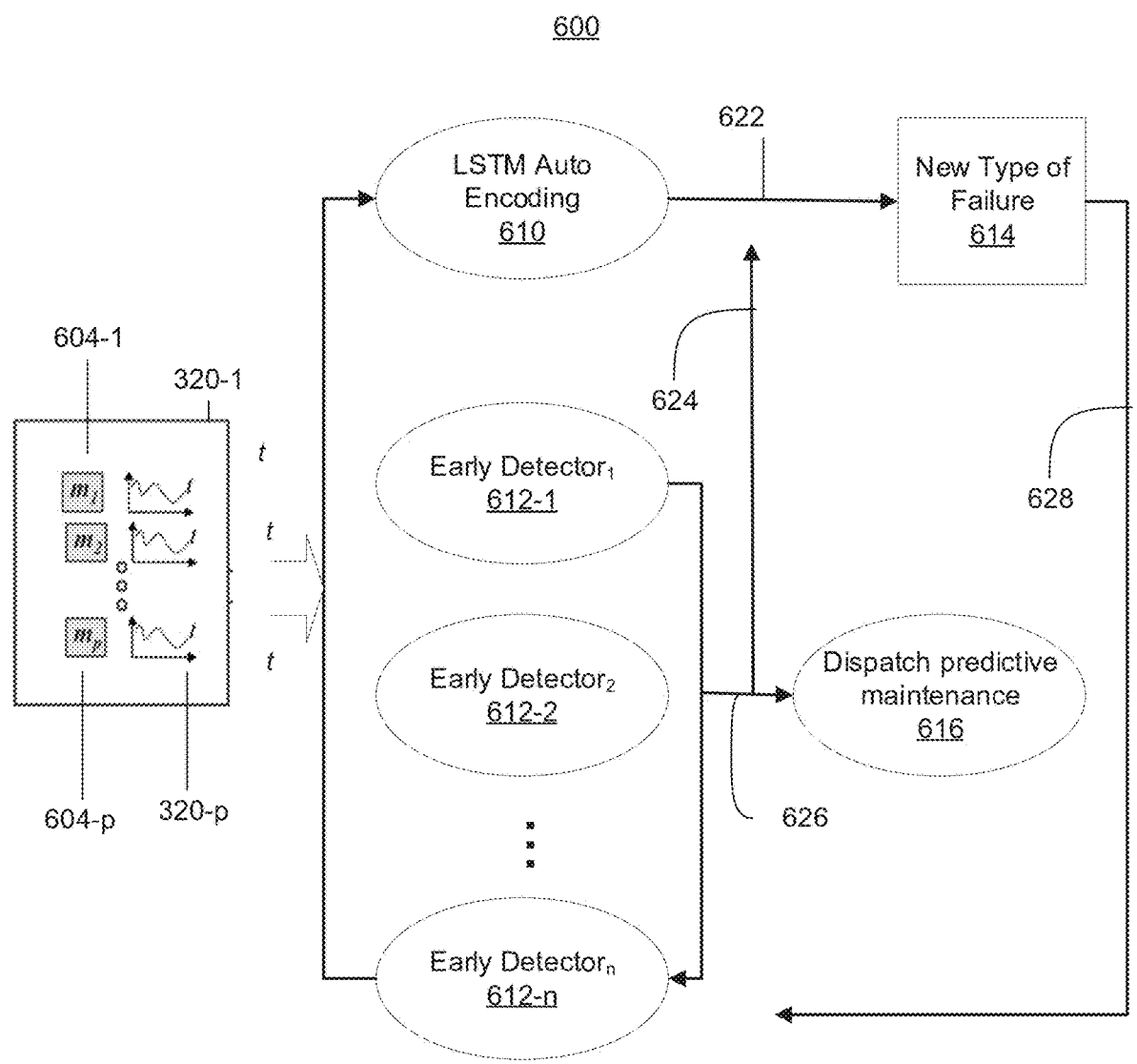
FIG. 8 is a block diagram illustrating a system for early anomaly prediction on multi-variate time series data, in accordance with the present invention.

Referring now to FIG. 8, a block diagram illustrating a system 600 for early anomaly prediction on multi-variate time series data, according to an example embodiment.

As shown in FIG. 8, system 600 includes a long short-term memory (LSTM) auto-encoding 610 and receives monitoring 604 (shown as $m_1$ 604-1 to $m_p$ 604-p) of time series 320 (shown as 320-1 to 320-p) at early detectors 612 (shown as early detectors$_x$(where x=1 to n) 612-1 to 612-n). LSTM auto-encoding 610 uses unsupervised or semi-supervised anomaly detection 622 to determine new types of failure 614.

LSTM auto-encoding 610 receives and analyzes the monitoring 604 of time series 320. The system uses topology inspired neural-network anomaly detection (TINA) (open source environment developed to accelerate the process of image analysis research) to train on normal period and test on testing period. TINA makes use of a recurrent neural network (RNN) (e.g., LSTM) autoencoder and autoregressive to characterize the multi-variate time series during system normal stage. Additionally, TINA can be used to conduct anomaly detection. If the reconstruction error increases, then an abnormal event has occurred (for example, new type of failure 614).

The reconstruction error on different features can be used by LSTM auto-encoding 610 to find which sensors are problematic.

The new type of failure 614 can be used to determine early symptom feature extraction 628. The system (particularly LSTM auto-encoding 610) can use the multi-instance learning for extracting the precursor features. LSTM auto-encoding 610 uses contrastive loss to compare similar and dissimilar pairs (of feature vectors). The abnormal period is also used to improve the robustness of extracted precursor features.

Early detectors 612 determine whether there are no symptoms 624, in which instance the result can be noted, or find early symptoms 626, in which instance the early symptoms are input to dispatch predictive maintenance 616.

For each type of failure, early detectors 612 extract the precursor symptoms. Early detectors 612 compare the similarity of historical early symptom features and the upcoming features. If the similarity exceeds a threshold (for example, is very high), early detectors 612 report the early detection of corresponding failure.

The system 300 uses multi-instance learning to allow the use of labeled data that include uncertainty about when exactly the precursor symptoms show up. The system also uses contrastive loss to allow extraction of precursor features even in instances in which the labeled data is (for example, very) limited.

The system 300 puts on the constraint that the features in the precursor symptoms are the subset of the feature of the real abnormal events, so that the inferred precursor features are more robust and interpretable.

Dispatch predictive maintenance 616 can differentiate the importance of different types of early symptoms and dispatch the most efficient solution to each of the different types of early symptoms. For example, dispatch predictive maintenance 616 can identify early symptoms that are likely to result in severe anomalies (or consequences) versus symptoms that can lead to increasing expenditure of energy, money, and other resources. Dispatch predictive maintenance 616 can access a predetermined list of possible solutions to the problems regarding the early symptoms and dispatch a selected solution based on past efficacy, position of relevant personnel, automated responses, etc. The result of that interaction can be factored into future decisions by dispatch predictive maintenance 616.

Referring now to FIG. 9, a method 700 for system anomaly detection based on retrieving a set of most similar logs is illustratively depicted in accordance with an embodiment of the present invention.

At block 710, system 300 identifies a user labeled abnormal time period that includes an anomaly event. For example, historical observation of multi-variate time series data can be collected. An anomaly event can be reported, and a user can annotate the anomaly event.

At block 720, system 300 determines a multi-variate time series segment that occurs before the user labeled abnormal time period (including the anomaly event).

At block 730, system 300 treats the multi-variate time series segment to include precursor symptoms of the anomaly event. For example, a relatively large multi-variate time series time segment before the user labeled abnormal time period can be treated to include the precursor symptoms of the subsequent anomaly event. For each user labeled event, system 300 generates corresponding precursor bags.

At block 740, system 300 determines instance sections from the multi-variate time series segment. The label associated with the subsequent anomaly event is used as the label of the precursor bag. system 300 slits each bag into instance sections (for example, segments, pieces) to identify when the early symptom shows up. These instance sections may have some overlaps.

At block 740, system 300 determines a (for example, precursor symptom) feature vector for each instance sections based on LSTM.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for early anomaly prediction on multi-variate time series data, comprising:
   identifying a user labeled abnormal time period that includes at least one anomaly event;
   determining a multi-variate time series segment of multivariate time series data that occurs before the user labeled abnormal time period;
   treating, by a processor device, the multi-variate time series segment to include precursor symptoms of the at least one anomaly event;
   determining instance sections from the multi-variate time series segment;
   determining at least one precursor feature vector associated with the at least one anomaly event for at least one of the instance sections based on long short-term memory (LSTM); and
   dispatching predictive maintenance based on the at least one precursor feature vector.

2. The method as recited in claim 1, further comprising:
   applying topology inspired neural network anomaly detection (TINA) to train on a normal period and test on a testing period, wherein if a reconstruction error increases then the at least one anomaly event is detected.

3. The method as recited in claim 1, further comprising:
   applying a reconstruction error on the at least one precursor feature vector to identify at least one problematic sensor.

4. The method as recited in claim 1, wherein determining the at least one precursor feature vector further comprises:
   extracting early symptom features, wherein early symptom features identify symptoms of an anomaly event before a predetermined threshold time.

5. The method as recited in claim 1, wherein determining the at least one precursor feature vector further comprises:
   using multi-instance learning to extract the at least one precursor feature vector.

6. The method as recited in claim 1, further comprising:
   applying contrastive loss to compare similar and dissimilar pairs of feature vectors.

7. The method as recited in claim 1, further comprising:
   using an abnormal period to improve a robustness of the at least one precursor feature vector.

8. The method as recited in claim 1, further comprising:
   differentiating an importance of different types of early symptoms; and
   dispatching a most efficient solution based on the different types of early symptoms.

9. The method as recited in claim 1, further comprising:
   applying a label to the multi-variate time series segment based on the anomaly event.

10. The method as recited in claim 1, further comprising:
    for each type of failure, extracting at least one precursor symptom;
    comparing a similarity of historical early symptom features and at least one upcoming feature; and
    in response to the similarity exceeding a threshold, reporting early detection of a corresponding failure.

11. The method as recited in claim 1, wherein determining the at least one precursor feature vector further comprises:
    applying:

$$z = \Sigma_{k=1}^{K} a_k h_k$$

wherein z is a representation of an entire bag, k is an index of instances in each bag, K is a total number of instances in one bag, a is an attention weight of a given instance, and h is a representation of the given instance.

12. A computer system for early anomaly prediction on multi-variate time series data, comprising:
    a processor device operatively coupled to a memory device, the processor device being configured to:
    identify a user labeled abnormal time period that includes at least one anomaly event;
    determine a multi-variate time series segment of multivariate time series data that occurs before the user labeled abnormal time period;
    treat the multi-variate time series segment to include precursor symptoms of the at least one anomaly event;
    determine instance sections from the multi-variate time series segment;
    determine at least one precursor feature vector associated with the at least one anomaly event for at least one of the instance sections based on applying long short-term memory (LSTM); and
    dispatch predictive maintenance based on the at least one precursor feature vector.

13. The system as recited in claim 12, wherein the processor device is further configured to:
    apply a reconstruction error on the at least one precursor feature vector to identify at least one problematic sensor.

14. The system as recited in claim 12, wherein, when determining the at least one precursor feature vector, the processor device is further configured to:
    extract early symptom features, wherein early symptom features identify symptoms of an anomaly event before a predetermined threshold time.

15. The system as recited in claim 12, wherein, when determining the at least one precursor feature vector, the processor device is further configured to:
    use multi-instance learning to extract the at least one precursor feature vector.

16. The system as recited in claim 12, wherein the processor device is further configured to:
    apply contrastive loss to compare similar and dissimilar pairs of feature vectors.

17. The system as recited in claim 12, wherein the processor device is further configured to:
    use an abnormal period to improve a robustness of the at least one precursor feature vector.

18. The system as recited in claim 12, wherein the processor device is further configured to:
    differentiate an importance of different types of early symptoms; and
    dispatch a most efficient solution based on the different types of early symptoms.

19. The system as recited in claim 12, wherein multi-variate time series segment is provided by a complex cyber-physical system.

* * * * *